May 12, 1959
L. L. LICCINI ET AL
2,885,890
WATER COOLED PITCHING-MOMENT BALANCE
Filed Nov. 16, 1956
2 Sheets-Sheet 2
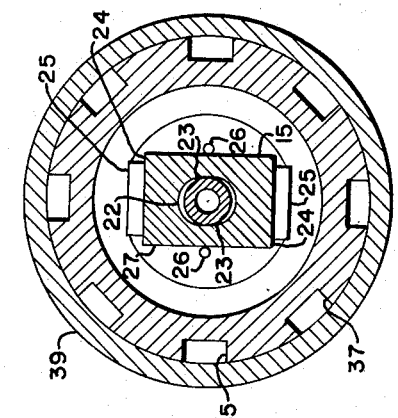
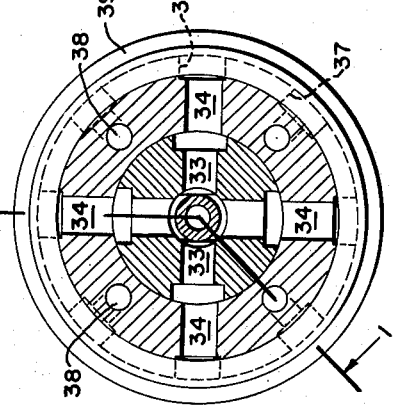
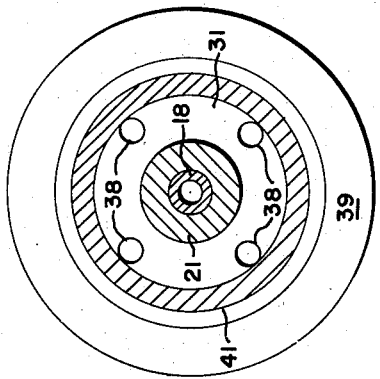
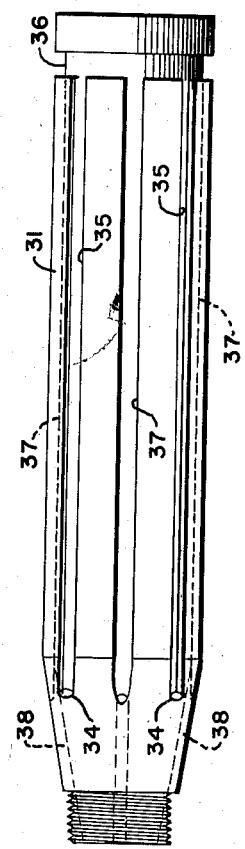
INVENTORS
L. L. LICCINI
R. H. CORNETT
BY
ATTYS

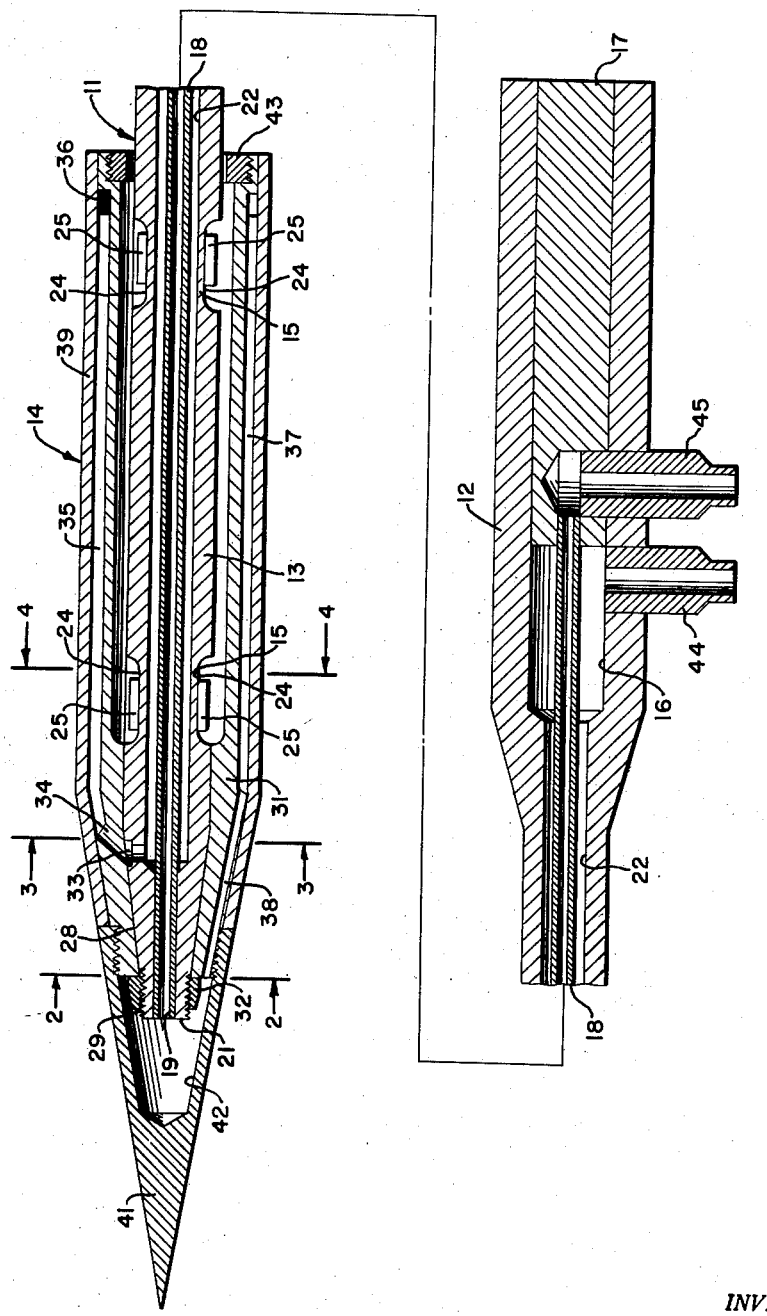

United States Patent Office 2,885,890
Patented May 12, 1959

---

2,885,890

WATER COOLED PITCHING-MOMENT BALANCE

Luke L. Liccini and Ray H. Cornett, Silver Spring, Md., assignors to the United States of America as represented by the Secretary of the Navy Application November 16, 1956, Serial No. 622,715

10 Claims. (Cl. 73—147)

(Granted under Title 35, U.S. Code (1952), sec. 266)

The invention described herein may be manufactured and used by or for the Government of the United States of America for governmental purposes without the payment of any royalties thereon or therefor.

The present invention relates to hypersonic wind tunnel instrumentation and more particularly to a water-cooled balance for supporting test models within the tunnel whereby aerodynamic tests may be made to determine the effect of a fluid current thereon.

In a hypersonic wind tunnel, where air speeds of Mach 5 to 10 are reached, the supply air must be preheated to prevent air liquefaction in the tunnel test section. However, this preheating of the air produces stagnation temperatures on the test model reaching as high as 1000 degrees F., which adversely affects the performance of the balance and results in unreliable data being obtained. Heretofore, such data was obtained by use of external strain-gage balances or external counter weight-balance systems which had the attendant disadvantages such as the necessity of taking tare measurement, the need for a shield around the system, the requirement of a large free area around the tunnel in which to place the shielded vessel containing the measuring apparatus and of equipment for maintaining the temperature in the tank or vessel constant as well as the pressure in the tank or vessel at or near the model pressure.

Essentially, the strain-gage balance of the present invention comprises a water-cooled sting, strain-gage balance and test model, the several parts being maintained by means of cooling water at, or substantially at, the selected temperature at which the strain-gage balance was calibrated; whereby reliable results are obtained that are comparable in accuracy to those usually obtained at supersonic Mach numbers using conventional strain-gage balances.

It is therefore an object of the present invention to provide a new and improved strain-gage balance for use in a hypersonic wind tunnel.

Another object is the provision of a new and improved wind tunnel strain-gage balance having means for maintaining the strain gages of the balance at, or substantially at, a desired temperature.

A further object of the invention is to provide a wind tunnel balance that is cooled by water.

A final object of the invention is the provision of a wind tunnel strain-gage balance formed with water-conducting passageways whereby cooling water may be passed through the balance and the strain gages of the balance may be kept at, or substantially at, the temperature at which the balance was calibrated.

Other objects and advantages of the invention will hereinafter become more fully apparent from the following description of the annexed drawing, which illustrates a preferred embodiment, and wherein:

Fig. 1 is a fragmentary side view, in section, of a preferred embodiment of the invention;

Fig. 2 is a sectional view, on an enlarged scale, along line 2—2 of Fig. 1 and looking in the direction of the arrow;

Fig. 3 is a sectional view, on an enlarged scale, taken generally along line 3—3 of Fig. 1 and looking in the direction of the arrows; line 1—1 indicating generally the line along which the section of Fig. 1 is taken;

Fig. 4 is a sectional view, taken along line 4—4 of Fig. 1 and looking in the direction of the arrows; and Fig. 5 is a side view of the inner member of the test model body and which shows the arrangement of the channels formed therein.

Referring now to the drawing, wherein like reference characters designate like or corresponding parts throughout the several views, there is shown in Fig. 1 a strain-gage balance embodying the present invention and designated generally by reference numeral 11. The main parts of the balance are a sting 12 and a balance portion 13 formed integral with the sting, the sting being adapted to be supported by an adjustable support in a wind tunnel. The balance portion 13 is adapted to support a hollow test model, designated generally by numeral 14, for disposition of the model in a wind tunnel.

The sting and balance portion are formed of a single piece of metal, preferably stainless steel, turned to provide a cylindrical portion of fair diameter, which constitutes the sting 12, and a slender cylindrical portion of smaller diameter than the sting, which constitutes the balance portion 13. At spaced points on the slender cylindrical portion, the metal is cut away so as to provide, on said portion, rectangular gage sections 15, better understood by reference to Fig. 4. Extending longitudinally of the sting and balance portions are a series of central bores of different diameters; see Fig. 1. One end of the largest bore 16, which is in the sting, is closed off by a plug 17, which supports one end of a conduit 18 that extends from the plug through a snug-fitting bore 19 within the free end 21 of the balance portion and terminates flush therewith. The major portion of the conduit extends through a bore 22 which has a generally oval shape at the portion opposite the strain gages, Fig. 4. Preferably, the sizes of bore 22 and of conduit 18 are so chosen that the parts of the cross-sectional area of bore 22 not occupied by the conduit will be approximately equal to the cross-sectional area of the passageway through the conduit, for reasons which later will become clear.

To prevent any error arising from intermitten contact, the conduit is silver-brazed or soldered, or otherwise secured, as at 23, to the rectangular gage sections. Thus, the bending sections of the balance portion are comprised of the rectangular gage sections and the conduit secured thereto.

Bonded to opposite side surfaces 24 of the rectangular gage sections, by a suitable cement or the like, are strain gages 25; standard 90 ohm Baldwin Bakelite-base strain gages, cemented in accordance with factory-recommended procedures, have been successfully employed. For the purpose of obtaining as true a value as possible of the strain gage temperatures, thermocouples 26 are mounted on the gage sections, preferably next to the strain gages. However, inasmuch as the strain gages occupied most of the flat of the side surfaces 24, it was found necessary to locate the thermocouples on the flats or side surfaces 27, 90° from the strain gages. Nevertheless, the proximity of the thermocouples to the strain gages, coupled with the high conductivity of the metal, was found to be sufficient to give substantially true readings of the strain gage temperatures. The leads (not shown) for the strain gages and thermocouples may be placed in a suitable groove (not shown) formed in the sting and balance portion and cemented in place in the groove, according to conventional practice.

Viewing Fig. 1, it will be noted that the free end of the balance portion is tapered as at 28, and is provided with a threaded end 29. The tapered portion 28 is adapted to be received in a complementary tapered recess in an inner body member 31 of the test model 14, the test model body member being held on the tapered portion by means of a threaded member 32 threaded on the threaded end 29 of the balance portion.

Formed in the tapered portion 28 are four equally spaced openings 33 with the axes thereof disposed in a plane normal to the longitudinal axis of the balance portion, said openings communicating with bore 22; see Fig. 3. Communicating with openings 33 are four equally-spaced ports 34 formed in the test model body 31, the ports, in turn, each communicating respectively with a groove or channel 35, of a series of four, formed in the outer periphery of the test model body. The grooves or channels are parallel and equally-spaced around the test model and terminate in a circumferential groove or header 36 located near the rear end of said body. In communication with and extending from the circumferential groove or header 36, are four additional parallel equally-spaced grooves or channels 37 which are arranged intermediate of and in alternate relation to the first-mentioned grooves or channels 35; see Fig. 5. Extending from each of the grooves or channels 37 is a bore 38, one of four, formed in the forward of the test model body.

The inner body member 31 of the test model is enclosed by an outer shell 39 which is close fitting and provides a cover for the grooves or channels, thereby converting the same into conduits or passageways. Threaded on the forward end of the test model body is a pointed nose or cap 41 having an internal hollow portion or cavity 42, in which the threaded end of the balance portion is received and with which bores 38 are in communication. The rear end of the test body has threaded therein a ring 43, the ring having a sufficient internal diameter to provide necessary clearance between the ring and the balance portion.

The sting 12 is provided with a pair of nipples, one nipple 44 communicating with the bore 16 in the sting and the other nipple 45 extending into the plug 17 and communicating with the conduit 18, nipple 45 being adapted to be connected to a source of cooling water and nipple 44 being adapted to be connected to means receiving the return water.

In the operation of the balance, the sting is mounted in an adjustable support disposed in the wind tunnel and the leads from the strain gages and thermocouples are connected to suitable instruments. The water inlet nipple 45 is connected to a source of water, the temperature of which may be varied, such as the conventional water mixing faucet, and the water outlet nipple 44 is piped to a container or to a drain, as desired. The water entering by way of nipple 45 flows through conduit 18 and out the end thereof into cavity 42, from which it returns through bores 38 and channels 37 to header 36. From header 36, the water flows through channels 35, ports 34 and openings 33 into bore 22 for return to nipple 44. The controls for the flow of water are adjusted so that the strain gages are at a temperature at which the balance was calibrated, the temperature of the strain gages being indicated by the instruments connected to the thermocouples, and such calibrated temperature is maintained or substantially maintained, during tests by proper adjustment of the water controls.

By making the cross-sectional area of the passageways in bore 22 for the returning water approximately equal to the cross-sectional area of the passageway through the conduit for the entering water, the velocity of the water flowing through the bore will be substantially equal to the velocity of the water flowing through the conduit and opposite in direction and any effect on the rectangular gage sections due to the water flow through the bore will be substantially counteracted by the effect due to the flow through the conduit and vice versa. The same applies to the water flowing in grooves or channels 35 and 37. For a check, the balance was calibrated by standard methods and afterwards tested with and without water flow to determine if the flow of water placed a load on the gage sections; no change in strain-gage readings was observed.

From the foregoing, it is apparent that a water-cooled balance has been provided in which the operation of the balance is not adversely affected by the high stagnation temperatures encountered in a hypersonic wind tunnel nor by the forces of the water flowing therethrough, and reliable results are obtained.

Various modifications are contemplated and may obviously be resorted to by those skilled in the art without departing from the spirit and scope of the invention, as only a preferred embodiment thereof has been disclosed.

What is claimed and desired to be secured by Letters Patent of the United States is:

1. In a wind tunnel balance, in combination, a sting, a balance portion integral with said sting, said balance portion being provided with a gage section, said gage section having a bore therethrough, said bore being of a cross-sectional shape that is generally oval and having a long axis and a short axis, and a conduit disposed within said bore centrally thereof, said conduit being cylindrical and having an external diameter that is equal to the short axis of said bore, said conduit being tangent to walls of said bore that are opposite each other on the short axis of the bore, said conduit and bore constituting passageways for flowing water for cooling said gage section.

2. The combination claimed in claim 1, further characterized in said conduit being fixedly secured to the walls of the bore adjacent the points of tangency of the conduit and walls.

3. The combination claimed in claim 2, further characterized in said conduit being fixedly secured to the aforementioned walls of the bore by silver brazing.

4. The combination claimed in claim 1, further characterized in said bore being of a cross-sectional shape that is generally oval and having a long axis and a short axis, said conduit being cylindrical and having an external diameter that is equal to the short axis of said bore, said conduit being tangent to walls of said bore that are opposite each other on the short axis of the bore, and the cross-sectional area of said bore outside said conduit being approximately equal to the cross-sectional area of the passageway through the conduit.

5. In a wind tunnel balance, in combination, a portion provided with a rectangular gage section, said gage section having a bore therethrough, said bore having an elongated cross-sectional area which has a long and a short axis, a conduit disposed within said bore centrally thereof, said conduit being cylindrical and having an external diameter equal to the short axis of the cross-sectional area of the bore, said conduit being tangent to opposite walls of the bore and fixedly secured thereto, said gage section having a pair of opposite side surfaces, and a plurality of strain gages, each of which is secured to a respective one of said side surfaces, said conduit and bore constituting passageways for flowing water for cooling said gage section and the strain gages secured thereto.

6. The combination claimed in claim 5, further characterized in the sizes of said bore and conduit being such that the cross-sectional area of the passageways through the conduit is approximately equal to one-half of the cross-sectional area of the bore.

7. In a wind tunnel balance, in combination, a sting, a balance portion secured at one end thereof to said sting, said balance portion being provided with spaced apart gage sections, a hollow test model body secured to the free end of said balance portion and encompassing said gage sections, said model being provided with channels, said sting and balance portion having a central bore, a conduit centrally disposed within said bore, said bore having parts thereof of greater cross-section than said conduit, said channels, bore and conduit constituting passageways for flowing water, said conduit being supported at one end in said sting, the other end of said conduit being supported in the free end of said balance portion and extending therethrough, means communicating said other end of said conduit with certain ones of said channels, means communicating the other channels with said bore, means in communication with said bore and connected to said sting, and means in communication with said conduit and connected to said sting.

8. The combination claimed in claim 7, further characterized in said bore having a pair of opposite walls, and said conduit being fixedly secured to said opposite walls of the bore at substantially diametrically opposite points on said conduit.

9. In a test device for use in a wind tunnel, in combination, a cylindrical member provided with a gage section, said member having a free end that is tapered, a test model body having a complementary tapered recess receiving said tapered free end of said member, said body being hollow and encompassing said gage section, said body having a cap formed with an internal cavity in which the free end of said member is disposed, a conduit supported in said free end of the member and extending therethrough into communication with said cavity, said member having a central bore, said conduit being centrally disposed in said bore, said body being provided with a plurality of internal channels equally spaced therearound, each of said channels having a bore associated therewith and communicating with said cavity in said cap, said body also being provided with a plurality of grooves equal in number to said channels, said grooves being equally spaced around said body and disposed in alternate relation with respect to said channels, means respectively communicating said grooves with said bore, and means communicating said channels and grooves with each other; said channels, grooves, conduit and bore constituting passageways for flowing water for cooling the gage section and the test model body.

10. The combination claimed in claim 9, further characterized in said conduit being tangent to opposite walls of said bore and fixed thereto.

References Cited in the file of this patent

UNITED STATES PATENTS

| | | |
|---|---|---|
| 2,697,936 | Farrow | Dec. 28, 1954 |
| 2,703,848 | Kistler | Mar. 8, 1955 |
| 2,738,677 | Li | Mar. 20, 1956 |
| 2,768,526 | Trimble | Oct. 30, 1956 |
| 2,784,593 | Peucker | Mar. 12, 1957 |